Dec. 28, 1965 T. F. SARAH 3,226,051
LINE GUIDE CONTROL FOR A SPINNING REEL
Filed March 4, 1964 4 Sheets-Sheet 1

INVENTOR.
THOMAS F. SARAH
BY Hamilton & Cook
ATTORNEYS

Dec. 28, 1965   T. F. SARAH   3,226,051
LINE GUIDE CONTROL FOR A SPINNING REEL
Filed March 4, 1964   4 Sheets-Sheet 2

INVENTOR.
THOMAS F. SARAH
BY Hamilton + Cook
ATTORNEYS

INVENTOR.
THOMAS F. SARAH
BY Hamilton & Cook
ATTORNEYS

Dec. 28, 1965  T. F. SARAH  3,226,051
LINE GUIDE CONTROL FOR A SPINNING REEL
Filed March 4, 1964  4 Sheets-Sheet 4

INVENTOR.
THOMAS F. SARAH
BY Hamilton & Cook
ATTORNEYS

United States Patent Office 3,226,051
Patented Dec. 28, 1965

3,226,051
LINE GUIDE CONTROL FOR A SPINNING REEL
Thomas F. Sarah, Akron, Ohio, assignor to Pflueger Corporation, Akron, Ohio, a corporation of Ohio
Filed Mar. 4, 1964, Ser. No. 349,369
9 Claims. (Cl. 242—84.21)

The subsequent application is a continuation-in-part of my copending U.S. application, Serial No. 300,790, filed August 8, 1963. The present invention relates generally to fishing reels of the spinning type. More particularly, the present invention relates to fishing reels having a stationary spool and a radially enclosed flyer to wind the line on to the spool. Specifically, the invention relates to an undermounted spinning reel having a control operable by a finger on the casting hand to release the line for casting and snub the line at the proper time during the casing procedure to regulate the length of the cast.

The spinning reel with its stationary spool from which the line uncoils during casting has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open faced or closed face, finger snubbed or mechanically snubbed, and undermounted or overmounted.

The open face or closed face characteristics refer to the exposure of the spool. The closed face reels are usually provided with a cover cap, or the like, which encompasses the spool and permits exit of the line through an eyelet. Such a construction is advantageous in that the coils peeling off of the spool are confined within the cover cap so that the line reaches the first line guide on the fishing pole traveling in almost a straight line and therefore there is little or no opportunity for the line to tangle itself about the line guide. However, so confining the coils does add to the frictional resistance against the line as it pays out. In open face reel constructions there is no cover cap and the coils peeling off of the spool during the cast are not confined within the reel, thus reducing friction at the reel. However, the line is often still in a partial coil as it reaches the first line guide and the first line guide must be of increased diameter to reduce friction. With open face reels it is found necessary to provide at least the first line guide with sloping protectors extending from the pole to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top or upper side of the rod he is using an overmounted reel. If the reel is underneath or on the lower side of the rod, he is using an undermounted reel.

The finger snubbed reel requires that the fisherman use one or more fingers to engage, or snub, the line both to control release and flight of the line. A mechanically snubbed reel utilizes a metal snubbing pin or a pinching of the line between two elements to prevent the line from paying off the spool until the desired time and to snub the line at the desired time after the cast to control the flight.

As an example of applying such classifications to a typical reel, the reel disclosed in my U.S. Letters Patent No. 2,911,165, is a closed face, overmounted, mechanically snubbed spinning reel.

Many fishermen prefer the balance and the ease with which the pole may be held during retrieving of the line when an undermounted reel is used. However, there are also those fishermen who prefer to control all of the operations of the reel, except winding, with the fingers on the casting hand, and when the reel is undermounted, two hands are generally required to prepare the reel for casting or else a complex lever arrangement must be empolyed.

It is therefore an object of the present invention to provide an undermounted, mechanically snubbed spinning reel in which the line can be snubbed and released at the start of the cast by mechanism actuated by the fingers of the casting hand.

It is another object of the present invention to provide a spinning reel, as above, in which the flight or length of the cast can also be controlled by mechanism operable by the fingers on the casting hand.

It is still another object of the present invention to provide a spinning reel, as above, in which the snubbing of the line occurs by punching it against a cover cap which imparts a minimum frictional resistance to the line as it uncoils from the spool and yet sufficiently reduces the size of the coil leaving the reel so that there is little or no tendency for the line bindingly to engage the first line guide.

It is another object of the present invention to provide a spinning reel, as above, which has an improved mechanism whereby the line pick-up pin is retained in retracted position and returned to extended pick-up position, as desired.

It is a further object of the present invention to provide a spinning reel, as above, in which a single slide lock is movable to multiple positions for progressively disassembling the reel It is a still further object of the present invention to provide a spinning reel, as above, in which the brake adjustment control is readily accessible It is an even further object of the present invention to provide a spinning reel, as above, which is relatively uncomplicated and economical to produce.

These and other objects of the invention, as well as the advantages thereof, over existing and prior art forms, will be apparent in view of the following detailed description in the attached drawings and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 1:
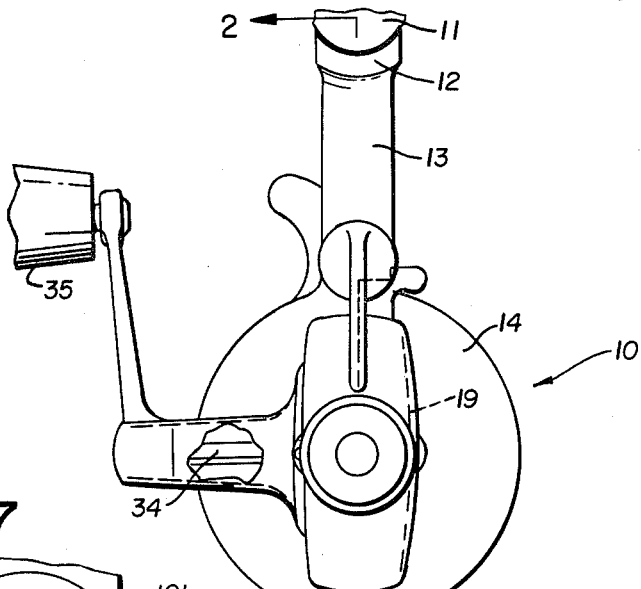
FIG. 1 is a rear elevation of a reel constructed in accordance with the subject invention.

In general, a spinning reel constructed according to the concept of the present invention is of the undermounted type and has a fixed spool carried within the frame. A rotatable flyer is mounted adjacent the outer, or line access, side of the spool. The flyer is comprised of a carrier and a pin holder radially slidable with respect to said carrier. The pin holder has a radially oriented pick-up pin fixed thereto. A snubbing cap generally in the shape of a cover cap except with a much larger opening encircles the spool and flyer and is mounted on the reel so as to be slidable axially of the spool by actuation of a finger operated slide plunger attached thereto. Actuation of the slide plunger snubs the line between the pin holder and the cap and, at the same time, radially shifts the pin holder to retract the pick-up pin.

A frictional braking mechanism is adjustable from the rear of the reel where it is readily accessible. A lock bar along the side of the reel is slidable from locked position to three unlocked positions to permit successive removal of first, the snubbing cap; second, the flyer; and third, the spool.

Referring more particularly to the drawings, the improved reel, indicated generally by the numeral 10, is detachably mounted on the under side of a rod 11, as by the mounting shoe 12, in a well-known manner. An offset bar 13 spaces the reel housing 14 sufficiently below the mounting shoe 12 so that the fisherman may grasp the rod with his fingers between the housing 14 and shoe 12, and even with two fingers straddling the offset bar 13.

The housing 14 is divided by an integral partition wall 15 into a gear compartment 17 and a spool compartment 18. A cover plate 19 on the side of the rear, preferably flattened, portion of the housing containing the gear compartment 17 provides access thereto.

Fixed to and extending forwardly of the partition wall 15, is a cylindrical sleeve bearing bushing 20. Interiorly of bushing 20 is a flyer shaft 21 mounted for rotation. Exteriorly of the bushing 20 an axially slidable spool 22 is supported. The rear portion of flyer shaft 21 extends through the partition wall 15 and into gear compartments 17 and terminates in a slot 23.

Forwardly of the slot 23 is an annular groove 24 which will be more fully hereinafter described in conjunction with the take apart mechanism.

Axially aligned with the flyer shaft 21 is the drive shaft 25. A milled flat 26 on the forward end of the drive shaft 25 is insertably received within the slot 23 in the rear of the flyer shaft, thus forming the drive connection therebetween. Rearwardly of the flat 26, the drive shaft 25 is engaged by a traverse block 28 slidably carried thereon and attached to the spool 22 by a plurality of spool pins 29 which extend through appropriate bores 30 in the intervening partition wall 15. The traverse block 28 is provided with a slot 31 transversely to the axis of drive shaft 25 which is engaged by a pin 32 extending from the face of drive gear 33.

The drive gear 33 is of the standard type and is nonrotatably secured to a crank shaft 34 rotated by the usual crank handle 35.

The drive gear 33 meshes with a bevel gear pinion 36 secured, by a hereinafter described braking means, to the drive shaft 25 and is positioned rearwardly of the traverse range of block 28.

A radially extending annular shoulder 38 on pinion 36 rearwardly of the bevel gear teeth 39 is provided with teeth 40 around the periphery thereof which are engaged by anti-reverse pawl 41.

Immediately to the rear of the pinion 36 a journal 42 is attached to the drive shaft 25 which is in turn supported in bearing 43. The rear face of the journal 42 is provided with a counterbore 44 into which the rearmost end of the drive shaft 25 extends. This end of drive shaft 25 also has a milled flat 45 on which is nonrotatably mounted a brake washer 46. The washer 46 is sandwiched between two additional brake discs 48 and 49, which are positioned within counterbore 44 but not otherwise connected to drive shaft 25 other than through their frictional contact with the brake washer 46.

A preferably metallic control washer 50 is also received in counterbore 44 and may be prevented from rotation by having lugs 51 on control washer 50 engaged with axial grooves 52 in the inner circumferential surface of counterbore 44.

A portion of the radially outer surface of journal 42 generally axially coextensive with the counterbore 44 is provided with threads 53 so that the rearmost journal 54, rotatably received in bearing 55, may be secured thereto. Journal 54 is provided with a threaded bore 56 for adjusting screw 58, the control knob 59, for which is positioned exteriorly of the rearmost portion of the housing 14.

The flyer, indicated generally by the numeral 60, is comprised with a cup-shaped carrier 61 and a pin holder, or slide 62 and is nonrotatably mounted on the forward end of the flyer shaft 21 for rotation therewith. Specifically, the base 63 of the cup-like carrier 61 is swaged, or otherwise suitably attached to, flyer shaft 21. The skirt 64 of the carrier 61 extends rearwardly over the front flange 65 of the spool 22.

The pin holder 62 is secured to the carrier 61 by cap screw 66. The shank 68 of screw 66 passes through a radially oriented elongate guide slot 69 in the carrier 61 and secures the holder 62 to carrier 61. The washer 70 on the shank 68 of screw 66 is of greater diameter than the lateral span of the slot 69 to engage the base 63 of the carrier 61 between the washer 70 and the holder 62 sufficiently to mount the holder 62 on the carrier 61 but not so tightly as to prevent radial translation of the holder 62 with respect to the carrier 61 in the radial direction of the slot 69.

Figure 2:
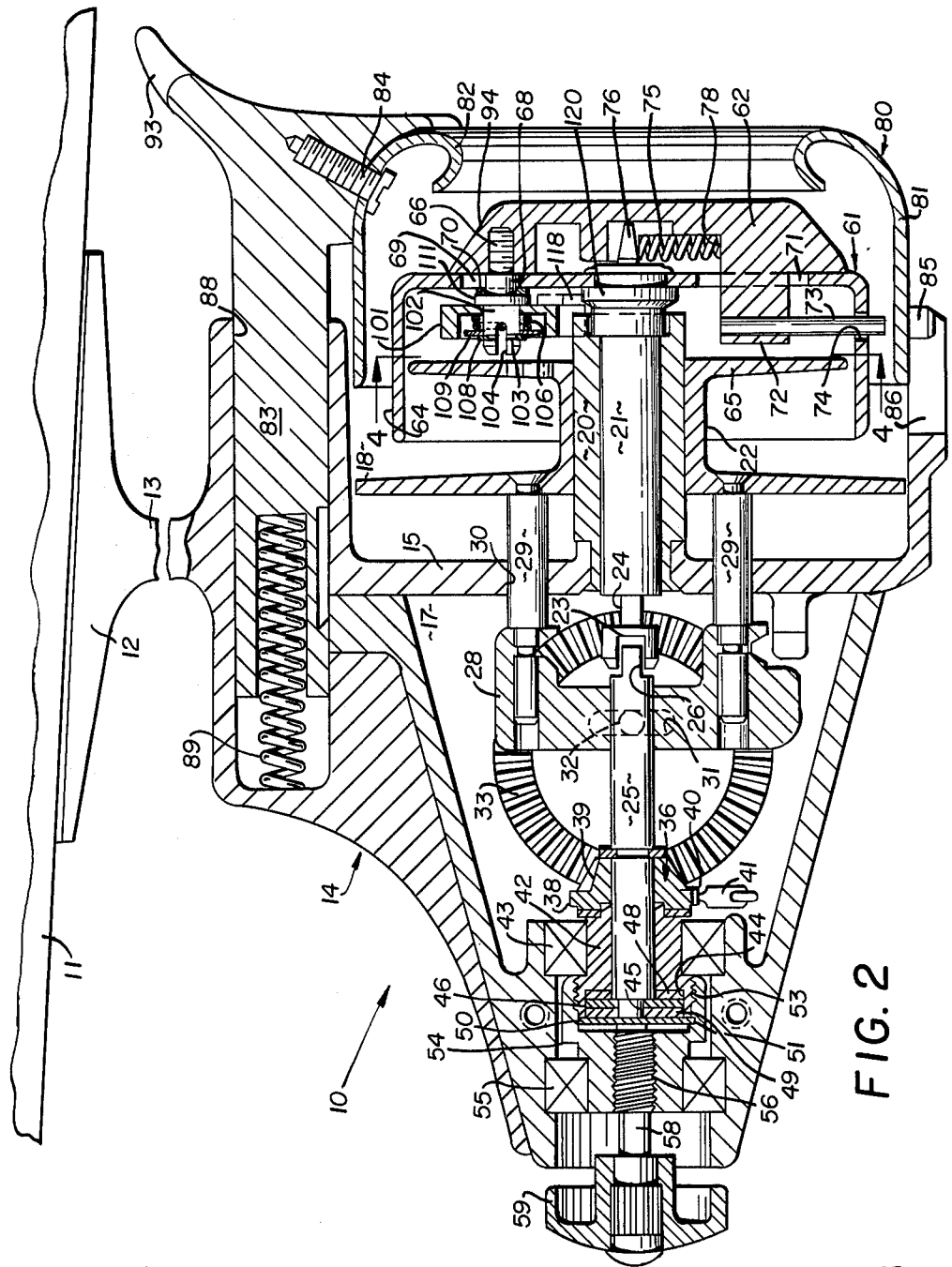
FIG. 2 is an enlarged longitudinal cross section taken substantially on line 2—2 of FIG. 1.

On the diametrically opposite side of flyer shaft 21 from the guide slot 69, a radially oriented access slot 71 is provided in the base 63 of carrier 61. Slot 71 is aligned with guide slot 69 and receives therethrough a spur 72 which extends rearwardly from the holder 62. The pick-up pin 73 is mounted in, and extends radially outwardly of spur 72 through a bore 74 in the skirt 64 of the carrier 61. The pick-up pin 73 normally extends outwardly of the carrier 61, as shown in FIG. 2, by the action of the compression spring 75 interposed between an extension 76 on the flyer shaft 21 and a shouldered recess 78 on the holder 62.

Radially outwardly of the spool 22 and flyer 60 is an annlar snubbing cap, indicated generally by the numeral 80. Cap 80, which comprises a skirt portion 81, positioned generally concentrically with the skirt 64 on carrier 61, and a radially inwardly directed annular snubbing collar 82, is secured to a slide plunger 83, as by screw 84. The cap 80 is stabilized by a guide stud 85 extending radially outwardly of the skirt portion 81 into a receiving slot 86 in housing 14. Plunger 83 is slidably received in a bore 88 provided in the housing 14 and oriented parallel to the flyer shaft 21. A compression spring 89 at the base of bore 88 is engaged by and acts to bias the plunger 83 forwardly and outwardly. The outer movement of plunger 83 is limited by a lock spur 90 (FIG. 3) which engages the limit shoulder 91 of an axially aligned slot 92 provided in plunger 83.

The plunger 83 also has a trigger 93 which extends generally upwardly of plunger 83 and is engageable by the forefinger of the fisherman. The finger pressure against trigger 93 acts against spring 89 and slides plunger 83 rearwardly. The cap 80 which is attached to plunger 83 moves therewith and the annular radially inwardly disposed collar 82 engages a truncated conical cam surface 94 on the forward face of the pin holder 62. The action of the collar 82 against the cam surface 94 slides the pin holder 62 radially with respect to the carrier 61 until the cam surface 94 is centered with respect to collar 82.

Figure 3:
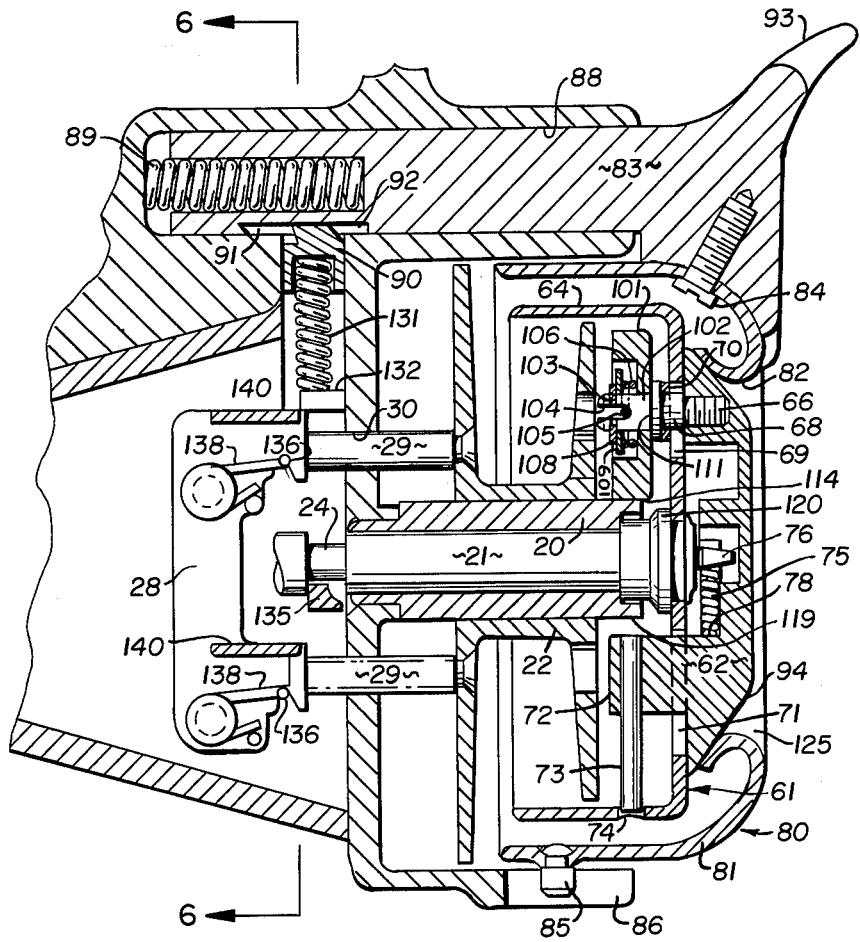
FIG. 3 is a fragmentary area of FIG. 2 with the finger control actuated and showing the locking mechanism actuated to retain the pick-up pin in retracted position.
Figure 5:
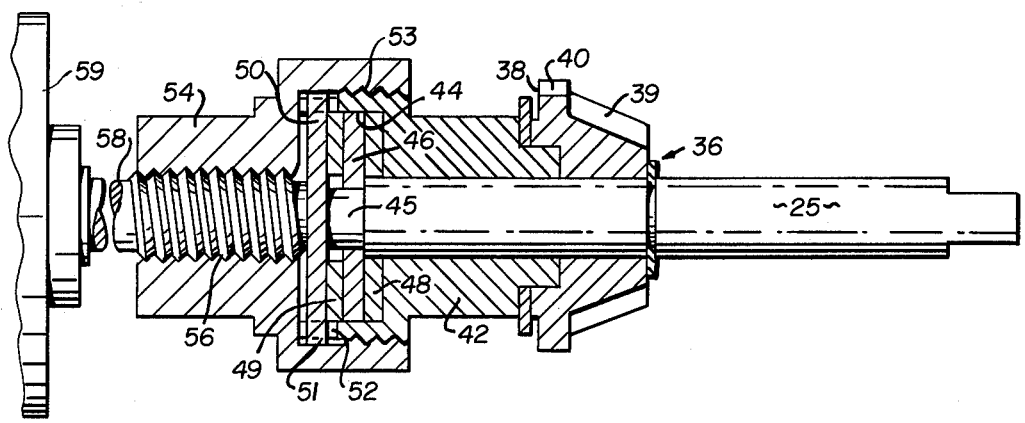
FIG. 5 is an enlarged area of FIG. 2 showing the brake control.

As is best shown in FIG. 3, when the cam surface 94 and the collar 82 are centered, the holder 62 is radially translated (from the position shown in FIG. 2) to compress spring 75 and withdraw the pick-up pin 73 so that it no longer extends radially outwardly of the skirt 64 on the carrier 61.

When the holder 62 is thus translated a latching mechanism thereon locks the holder 62 with the pick-up pin 73 retracted until the crank handle 35 is cranked to retrieve the line.

Figure 4:
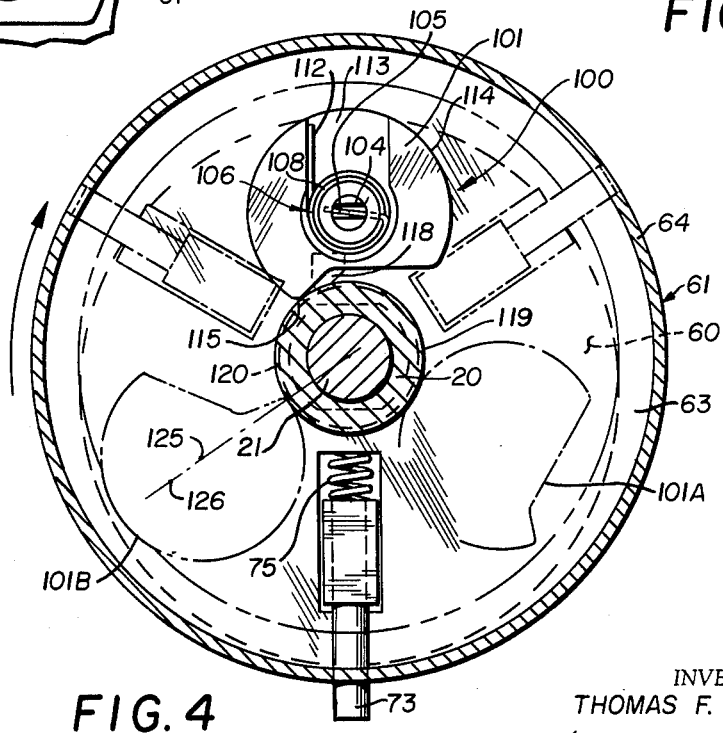
FIG. 4 is an enlarged cross section taken substantially on line 4—4 of FIG. 2.

As best shown in FIGS. 2–4, the latching mechanism, indicated generally by the numeral 100, comprises a disklike lock drum 101 rotatably mounted on the cap extension 102 of screw 66. The end of screw 66 has an annular groove 103 and a slot 104 which extends longitudinally from the outer end of screw 66 beyond the groove 103. One end 105 of a wire spring 106 is retained in the slot 104 by a retaining ring 108 seated in groove 103 and a washer 109 positioned against retaining ring 108.

The spring 106 has one or more spirals to provide a compression portion which urges the lock drum 101 axially into engagement with a shoulder 111 on screw 66. The spirals, which are also somewhat coiled, effect a rotative bias to the lock drum 101 by the extended spring end 112 which is received in a generally radial notch 113 in the base of lock drum 101.

As best shown in FIG. 4, a portion of the annular periphery 114 of lock drum 101 is relieved to form a pawl 115 at the junction of annular periphery 114 and the relieved portion. Attached to the lock drum 101 is a second pawl 118 which is circumferentially and axially spaced from said first pawl 115 and axially aligned with the relieved portion of the lock drum 101. The radial extent of said second pawl 118 is less than the radial extent of said first pawl 115 for a purpose more fully hereinafter described. The annular periphery 114 of lock drum 101 engages the outer, or blocking, surface 119 of fixed bushing 20 when the pick-up pin 73 is in retracted position, as shown in the chain line representation in FIG. 4.

The second pawl 118 engages an annular freeing shoulder 120 on the flyer shaft 21 just forwardly of the fixed bushing 20 when the pick-up pin 73 is in extended position with the relieved portion embracing, but not contacting, the bushing 20. With the second pawl 118 thus in engagement with the shoulder 120 the lock drum is free to rotate with the carrier 61 without either the annular periphery 114 or the first pawl 115 engaging the bushing 20.

The fisherman would operate this reel as follows. To cast the lure the fisherman would apply pressure to trigger 93 depressing the plunger 83. This brings the collar 82 against the conical cam surface 94 on the pin holder 62 both to translate the holder until the pick-up pin 73 is retracted and pinchingly to engage the line therebetween (FIG. 3).

Translation of the holder carries lock drum 101 therewith and moves both pawls 115 and 118 away from the bushing 20 and freeing shoulder 120, respectively. With the pawls thus freed, the torsional force of spring 106 rotates the lock drum 101 until the periphery 114 opposes the bushing 20.

The pressure against the trigger which initiated the above sequence is maintained until that moment during the cast when the fisherman desires to release the line. By releasing his finger pressure against the trigeger, pinching of the line is removed, but the pick-up pin 73 remains retracted by engagement of the periphery 114 of lock drum 101 with the bushing 20, and the line can freely uncoil, or peel, off the spool.

If desired, the fisherman may stop the cast at any time during the flight of the lure by simply again depressing the plunger 83 through finger pressure to trigger 93, and thereby pinch the line between collar 82 and cam surface 94.

Figure 7:
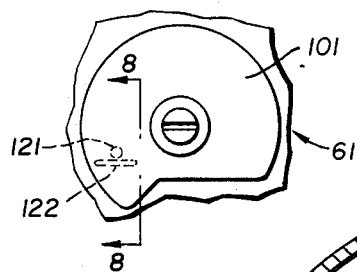
FIG. 7 is an enlarged partial area of FIG. 4 depicting an alternative lock drum turning means.
Figure 8:
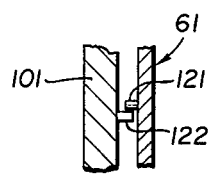
FIG. 8 is a cross section taken substantially on line 8—8 of FIG. 7.

While it has been found that the spring 106 is preferred, the lock drum may be turned to lock position 101A as shown in the chain line representation in FIG. 4 by other suitable means. As shown in FIGS. 7 and 8, for example, a pin 121 may extend perpendicularly from the base 63 of carrier 61 which interacts with the lug 122 on the lock drum 101 when the pin holder 62 is translated to retract the pick-up pin 73 to rotate the lock drum 101 from the unlocked position (solid line representation in FIG. 4) toward the locked position 101A (chain line representation in FIG. 4). Of course, this pin 121 and the lug 122 must be spaced sufficiently apart when the lock drum 101 is in the unlocked position so that the first pawl 115 clears the outer surface 119 of the fixed bushing 20 and the second pawl 118 clears the freeing shoulder 120 when the lock drum 101 is rotated toward the lock position by the translation of the lug 122 against the pin 121.

When rewinding is started by turning the crank handle 35, the flyer shaft 21 rotates the carrier 61 and the pin holder 62 which supports the lock drum 101 in the direction shown by the arrow in FIG. 4. The outer surface 119 of the fixed bushing 20 may be roughened, serrated, or even toothed, so that the lock drum 101 is caused to walk around the fixed bushing 20 by the frictional engagement therewith effecting a counter-rotation of the lock drum 101 about cap extension 102 against the torsional resistance of spring 106. When the lock drum 101 is rotated from the locking position 101A sufficiently that its center of rotation 125 is just past the line 126 perpendicular to a line tangent to the bushing 20 at the point of contact of the tip of the pawl 115 with the bushing 20, at the position 101B the compression spring 75 moves the pick-up pin 73 to extended position and thus rotates the lock drum 101 to the unlocked position all of which are shown in FIG. 4.

The present reel utilizes a mechanical snubbing of the line inherent to closed face reels, but at the same time permits the guide opening 125 in cap 80 to be of considerably larger diameter than the eyelet in most cover caps, thus reducing the friction against the line as it pays off of the reel while tending to reduce the coil size of the line to reduce the possibility of the line tying up on the first line guide on the fishing pole.

The particular brake mechanism of the present reel is most advantageous. Proper adjustment of the brake permits the fisherman to play and land fish much heavier than the test of the line he is using. The knob 59 on the brake mechanism of the present reel is at the rear of the reel where it is readily accessible and easily found by the fisherman's hand even while watching the tip of the rod and the line.

Figure 6:
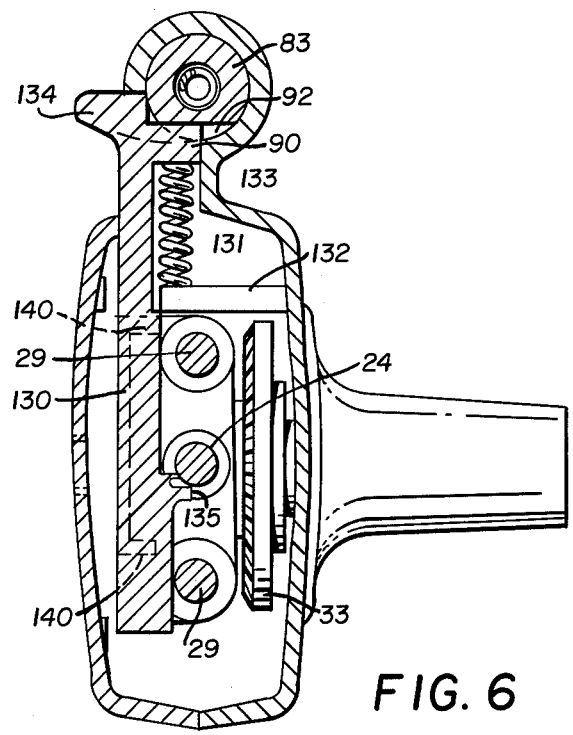
FIG. 6 is a cross section taken substantially on line 6—6 of FIG. 3.

The present reel also has a unique take-apart feature. A lock bar 130, as best seen in FIG. 6, is vertically—i.e., transversely to the axis of flyer shaft 21—slidable in housing 14. Bar 130 is located just rearwardly of partition 15 in the forward portion of gear compartment 17 and is upwardly biased by the action of a compression spring 131 positioned between ledge 132 in partition 15 and a shoulder 133 on the lock bar 130. Extending outwardly of housing 14 is the lock bar actuating lip 134 which is located near the top of the housing just rearwardly of the offset bar 13 where it is readily accessible for taking the reel apart.

The lock bar 130 is moved downwardly by pressure against the actuating lip 134. During the inital downward movement of lock bar 130 the lock spur 90 attached to lock bar 130 is retracted from slot 92 in plunger 83, thus permitting removal of the plunger 83 and the cap 80 attached thereto.

Further downward movement of lock bar 130 disengages a tooth 135 from the annular groove 24 in flyer shaft 21. This permits the flyer 60 and the shaft 21 attached thereto to be extracted forwardly out of the housing.

Finally, a further incremental downward movement applied to lock bar 130 disengages the spool pins 29 from the traverse block 28. As best shown in FIG. 2, the spool pins are inserted in corresponding bores in the traverse block 28. Each spool pin 29 has a notch 136 which receives the end of a wire spring 138 attached to the traverse block 28. A flange 140 is provided on the lock bar 130 for each spring 138 and is so positioned that the last portion of the downward movement of bar 130 causes the flanges 140 to contact their respective wire springs 138 and release them from their receiving notch 136 to permit removal of the spool 22 from the housing 14.

It should thus be apparent that the subject invention provides an undermounted, closed face, mechanically snubbed reel that accomplishes the objects of the invention.

What is claimed is:

1. In a spinning reel having a housing, normally non-rotatable line spool, a cup-shaped carrier adjacent said spool and fixed to a selectively rotatable shaft, a pick-up pin slidably mounted on said carrier extendible radially outwardly of said carrier and retractable with respect thereto, biasing means normally extending said pick-up pin radially outwardly of said carrier, an actuating means for retracting said pick-up pin within said carrier, latch means for retaining said pick-up pin in retracted position and selectively releasing said pick-up pin, comprising, a lock drum mounted on said carrier to be slidable with said pick-up pin and independently rotatable, said lock drum having an annular periphery with a relieved portion, a blocking means fixed to said housing means to rotate said lock drum until said annular periphery engages said blocking means when said pick-up pin is retracted to maintain said pick-up pin in retracted position, and means separate from said last named means selectively to drive said lock drum until said relieved portion is disposed opposite said blocking means to permit extension of said pick-up pin.

2. In a spinning reel having a housing, a normally non-rotatable line spool, a cup-shaped carrier adjacent said spool and fixed to a selectively rotatable shaft, a pick-up pin slidably mounted on said carrier extendible radially outwardly of said carrier and retractable with respect thereto, biasing means normally extending said pick-up pin radially outwardly of said carrier, an actuating means for retracting said pick-up pin within said carrier and a latch means for retaining said pick-up pin in retracted position and selectively releasing said pick-up pin, said latch means comprising, a lock drum, said lock drum mounted on said carrier to be slidable with said pick-up pin and independently rotatable, said lock drum having an annular periphery with a relieved portion, a blocking means fixed to said housing, means to rotate said lock drum until said annular periphery engages said locking means when said pick-up pin is retracted to maintain said pick-up pin in retracted position, frictional means acting between said lock drum and said blocking means to counter rotate said lock drum while said carrier is rotated until said relieved portion is disposed opposite said blocking means to permit extension of said pick-up.

3. In a spinning reel having a housing, a normally non-rotatable line spool, a cup-shaped carrier adjacent said spool and fixed to a selectively rotatable shaft, a pick-up pin slidably mounted on said carrier extendible radially outwardly of said carrier and retractable with respect thereto, biasing means normally extending said pick-up radially outwardly of said carrier, an actuating means for retracting said pick-up pin within said carrier and a latch means for retaining said pick-up pin in retracted position and selectively releasing said pick-up pin, said latch means comprising, a lock drum, said lock drum mounted on said carrier to be slidable with said pick-up pin and independently rotatable, said lock drum having an annular periphery with a relieved portion, a blocking means fixed to said housing, means to rotate said lock drum until said annular periphery engages said blocking means when said pick-up pin is retracted to maintain said pick-up pin in retracted position, and means separate from said last named means selectively to drive said lock drum until said relieved portion is disposed opposite said blocking means to permit extension of said pick-up pin, a freeing shoulder on said selectively rotatable shaft, a pawl on said lock drum, said pawl engaging said freeing shoulder when said pick-up pin is extended to prevent frictional contact between said lock drum and said blocking means.

4. In a spinning reel having a housing, a normally non-rotatable line spool, a cup-shaped carrier adjacent said spool and fixed to a selectively rotatable shaft, a pick-up pin slidably mounted on said carrier, spring means biasing said pick-up pin to extend position, an actuating means for retracting said pick-up pin within said carrier and a latch means for retaining said pick-up pin in retracted position and selectively releasing said pick-up pin, said latch means comprising, a lock drum, said lock drum mounted on said carrier to be slidable with said pick-up pin and independently rotatable about a center of rotation, said lock drum having an annular periphery with a relieved portion, a blocking means fixed to said housing, means to rotate said lock drum until said annular periphery engages said blocking means when said pick-up pin is retracted to maintain said pick-up pin in retracted position, a first and second pawl on said lock drum, the first said pawl at the juncture of said annular periphery and said relieved portion, the second said pawl being circumferentially spaced from, and radially inwardly of, said first pawl and axially aligned with said relieved portion, frictional means acting between said lock drum and said blocking means to counter rotate said lock drum until the center of rotation and the first pawl are positioned in such relation to each other that said spring means biases said pick-up pin into extended position, a freeing shoulder on said selectively rotatable shaft, said second pawl engaging said freeing shoulder when said pick-up pin is extended to prevent frictional contact between said lock drum and said blocking means.

5. In a spinning reel having a housing and a normally non-rotatable line spool, a flyer rotatably mounted adjacent to the spool, said flyer comprising a carrier and a holder, said carrier fixed to a selectively rotatable shaft, said shaft journaled for rotation in a bushing fixedly mounted in said housing, said holder mounted on said carrier for radial movement, a pick-up pin attached to said holder, spring means biasing said holder so that the pick-up pin normally extends radially outwardly of said carrier but is retractable with respect thereto, a cap supported on said housing and positioned radially of said flyer, said cap having a guide opening for permitting the passage of the line therethrough outwardly off the end of the spool, means mounting said cap on said housing for movement axially with respect to said flyer, means on said cap to engage said holder upon axially rearward movement of said cap, and latch means for retaining said pick-up pin in retracted position, said latch means comprising, a lock drum, said drum mounted on said holder for independent rotation, said lock drum having an annular periphery with a relieved portion, means to rotate said lock drum until said annular periphery engages said fixed bushing when said pick-up pin is in retracted position, and frictional means acting between said lock drum and said fixed bushing to counter rotate said lock drum upon rotation of said carrier until said relieved portion embraces said fixed bushing to permit extension of said pick-up pin.

6. In a spinning reel, as set forth in claim 5, having a freeing shoulder on said selectively rotatable shaft, a pawl on said lock drum, said pawl engaging said freeing shoulder when said pick-up pin is extended to prevent frictional contact between said lock drum and said fixed bushing.

7. In a spinning reel, as set forth in claim 5, wherein said means to rotate said lock drum includes a torsional spring means for rotating said lock drum until said annular periphery engages said fixed bushing, a freeing shoulder on said selectively rotatable shaft, a pawl on said lock drum, said pawl engaging said freeing shoulder when said pick-up is extended to prevent frictional contact between said lock drum and said fixed bushing.

8. In a spinning reel having a housing and a normally non-rotatable line spool, a flyer rotatably mounted adjacent to the spool, said flyer comprising a carrier and a holder, said carrier fixed to a selectively rotatable shaft, said shaft journaled for rotation in a bushing fixedly mounted in said housing, said holder mounted on said carrier for radial movement, a pick-up pin attached to said holder, spring means biasing said holder so that the pick-up pin normally extends radially outwardly of said carrier but is retractable with respect thereto, a cap supported on said housing and positioned radially of said flyer, said cap having a guide opening for permitting the passage of line therethrough outwardly off the end of the spool, means mounting said cap on said housing for movement axially with respect to said flyer, means on said cap to engage said holder upon axially rearward movement of said cap, and latch means for retaining said pick-up pin in retracted position, said latch means comprising, a lock drum, said lock drum mounted on said holder for independent rotation, said lock drum having an annular periphery with a relieved portion, said lock drum being independently rotatable about the center of said lock drum, means to rotate said lock drum until said annular periphery engages said fixed bushing when said pick-up pin is in retracted position, a first and second pawl on said lock drum, the first said pawl at the juncture of said annular periphery and said relieved portion, the second said pawl being circumferentially spaced from, and radially inwardly of, said first pawl and axially aligned with said relieved portion, frictional means acting between said lock drum and said fixed bushing to counter rotate said lock drum when said carrier is rotated and until immediately after the center of rotation of said lock drum and said first pawl are aligned perpendicularly to a line tangent said annular periphery at the point thereon contacted by said first pawl whereupon said spring means biases said pick-up pin into extended position, a freeing shoulder on said selectively rotatable shaft, said second pawl engaging said freeing shoulder when said pick-up pin is extended to prevent frictional contact between said lock drum and said fixed bushing.

9. In a spinning reel having a housing, a normally non-rotatable line spool, a cup-shaped carrier adjacent said spool and fixed to a selectively rotatable shaft, a holder mounted on said carrier and slidable between a radially inner and radially outer position, a pick-up pin mounted in said holder and extendible radially outwardly of an retractable with respect to said carrier, means acting between said carrier and said holder slidably biasing said holder to the outer position so that said pick-up pin is extended radially outwardly of said carrier, means for sliding said holder to the inner position to permit retraction of said pick-up pin within said carrier, and latch means for retaining said holder in the inner position and selectively releasing said holder, said latch mechanism comprising, a lock drum mounted on said holder to be slidable therewith and independently rotatable, said lock drum having an annular periphery with a relieved portion, a blocking means fixed to said housing, means to rotate said lock drum until said annular periphery engages said blocking means when said holder is moved to said inner position, and means separate from said last named means selectively to drive said lock drum until said relieved portion is disposed opposite said blocking means to permit said holder to be biased to said outer position.

References Cited by the Examiner

UNITED STATES PATENTS

| | | | |
|---|---|---|---|
| 2,668,024 | 2/1954 | Campbell | 242—84.2 |
| 2,901,193 | 8/1959 | Askins et al. | 242—84.21 |
| 2,903,201 | 8/1959 | Sarah | 242—84.2 |
| 3,105,650 | 10/1963 | Kuether | 242—84.2 |
| 3,107,876 | 10/1963 | Ament | 242—84.21 |

MERVIN STEIN, *Primary Examiner.*

UNITED STATES PATENT OFFICE
CERTIFICATE OF CORRECTION

Patent No. 3,226,051                                December 28, 1965

Thomas F. Sarah

It is hereby certified that error appears in the above numbered patent requiring correction and that the said Letters Patent should read as corrected below.

Column 1, line 8, for "subsequent" read -- subject --; column 2, line 11, for "empolyed" read -- employed --; line 23, for "punching" read -- pinching --; line 40, after "accessible" insert a period; column 3, line 69, after "by" insert -- an --; column 4, line 51, for "annlar" read -- annular --; column 5, line 66, for "trigeger" read -- trigger --; column 7, line 67, after "pick-up" insert -- pin --; column 8, line 16, for "extend" read -- extended --; line 60, after "said", first occurrence, insert -- lock --; column 10, line 13, for "an" read -- and --.

Signed and sealed this 27th day of December 1966.

(SEAL)
Attest:

ERNEST W. SWIDER                                        EDWARD J. BRENNER
Attesting Officer                                             Commissioner of Patents